US010022950B2

(12) United States Patent
Deane et al.

(10) Patent No.: US 10,022,950 B2
(45) Date of Patent: Jul. 17, 2018

(54) SYSTEMS AND METHODS FOR PROVIDING COUPLING JOINTS

(71) Applicant: Elwha LLC, Bellevue, WA (US)

(72) Inventors: Geoffrey F. Deane, Bellevue, WA (US); William D. Duncan, Kirkland, WA (US); Bran Ferren, Beverly Hills, CA (US); Roderick A. Hyde, Redmond, WA (US); Jordin T. Kare, Seattle, WA (US); Elizabeth L. Schubert, Bellevue, WA (US); Clarence T. Tegreene, Bellevue, WA (US)

(73) Assignee: Elwha LLC, Bellevue, WA (US)

(*) Notice: Subject to any disclaimer, the term of this patent is extended or adjusted under 35 U.S.C. 154(b) by 973 days.

(21) Appl. No.: 14/106,341

(22) Filed: Dec. 13, 2013

(65) Prior Publication Data

US 2015/0165684 A1 Jun. 18, 2015

(51) Int. Cl.
*G06K 9/00* (2006.01)
*B33Y 50/02* (2015.01)
*F16L 27/11* (2006.01)
*B29L 31/24* (2006.01)
*B33Y 80/00* (2015.01)

(52) U.S. Cl.
CPC .............. *B33Y 50/02* (2014.12); *F16L 27/11* (2013.01); *B29L 2031/24* (2013.01); *B33Y 80/00* (2014.12)

(58) Field of Classification Search
CPC ..... G06T 15/205; G06T 2215/16; F16L 27/11
See application file for complete search history.

(56) References Cited

U.S. PATENT DOCUMENTS

| 5,622,216 | A | 4/1997 | Brown |
| 5,893,404 | A | 4/1999 | Mendez et al. |
| 7,488,007 | B2 | 2/2009 | Weber |
| 8,079,620 | B1 | 12/2011 | Weber |
| 2003/0061011 | A1* | 3/2003 | Hoeft .................... G06F 17/509 703/1 |
| 2003/0225555 | A1* | 12/2003 | Gurumoorthy ......... G06F 17/50 703/9 |
| 2004/0173116 | A1* | 9/2004 | Ghorbel .................. F16L 55/26 104/138.2 |
| 2006/0204699 | A1 | 9/2006 | Maltezos et al. |
| 2006/0279079 | A1 | 12/2006 | Weber |
| 2007/0012891 | A1 | 1/2007 | Maltezos et al. |

(Continued)

FOREIGN PATENT DOCUMENTS

JP 2004-265321 A 9/2004

OTHER PUBLICATIONS

PCT International Search Report; International App. No. PCT/US2014/069812; dated Apr. 10, 2015; pp. 1-6.

(Continued)

*Primary Examiner* — Vu Le
*Assistant Examiner* — Guillermo Rivera-Martinez
(74) *Attorney, Agent, or Firm* — Foley & Lardner LLP (57) ABSTRACT

A system for providing a joint for connecting a first object and a second object includes a data acquisition device configured to acquire joint parameter data regarding the first object and the second object, and a controller coupled to the data acquisition device and configured to provide joint design data regarding a design of the joint based on the joint parameter data.

36 Claims, 8 Drawing Sheets

(56) References Cited

U.S. PATENT DOCUMENTS

| | | | |
|---|---|---|---|
| 2008/0255810 A1* | 10/2008 | Okada | G06F 17/50 703/1 |
| 2008/0275674 A1* | 11/2008 | Reghetti | G06F 17/5004 703/1 |
| 2009/0100784 A1 | 4/2009 | Garza et al. | |
| 2009/0164039 A1 | 6/2009 | Jung et al. | |
| 2010/0001521 A1 | 1/2010 | Vandal et al. | |
| 2010/0096030 A1 | 4/2010 | Hinkley | |
| 2010/0198563 A1 | 8/2010 | Plewe | |
| 2011/0043515 A1* | 2/2011 | Stathis | G01C 15/002 345/419 |
| 2011/0178619 A1 | 7/2011 | Jung et al. | |
| 2012/0053716 A1 | 3/2012 | Bickel et al. | |
| 2012/0124804 A1 | 5/2012 | Vandal et al. | |
| 2012/0132310 A1 | 5/2012 | Cavaliere et al. | |
| 2013/0006588 A1* | 1/2013 | Mulligan | G06F 17/509 703/1 |
| 2013/0132040 A1* | 5/2013 | Shook | G06F 17/509 703/1 |
| 2014/0192050 A1* | 7/2014 | Qiu | G06K 9/00214 345/420 |
| 2014/0210856 A1* | 7/2014 | Finn | G01C 15/002 345/633 |

OTHER PUBLICATIONS

Neri Oxman and Steven Keating; Building-Scale 3D Printing; http://www.media.mit.edu/research/groups/mediated-matter; known to be available at least as of Jun. 21, 2012, retrieved on Mar. 3, 2014, 3 pages.

Singer, Henry; On Enterprise Collaboration; Social Manufacturing; http://Henrysinger.blogspot.com/2012/04/social-manufacturing.html; Apr. 26, 2012; 1 page.

Symmons Industry; 3D printing is the heartbeat of Symmons Industries' Design Studio Live virtual design studio; Issue Date Jan. 2012; 2 pages.

Trimensional 3D Scanner for iPhone; application known to be available at least as of Jun. 21, 2012, www.trimensional.com/printing/; retrieved on Mar. 3, 2014, 2 pages.

Supplementary European Search Report; European App. No. EP 14 87 0282; dated May 4, 2017 (received by our Agent on May 19, 2017); pp. 1-9.

\* cited by examiner

SYSTEMS AND METHODS FOR PROVIDING COUPLING JOINTS

BACKGROUND

In building or construction applications, it is sometimes necessary to functionally connect two or more emplaced objects by a joint (e.g., fitting, coupling, etc.). For instance, two water pipes within a building may be substantially static and offset, requiring a pipe fitting to enable water flow between the two pipes. Some pipes, such as those with symmetric axes, can be connected with a common fitting shape (e.g., an elbow joint, a T-shaped fitting, a cross fitting, etc.). However, pipes that are substantially offset or have non-symmetric axes may require a custom fitting to functionally connect the pipes. The custom fitting may require a number of measurements of the two pipes and the surrounding area and a significant amount of time to design and manufacture the fitting.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

An embodiment of the present disclosure relates to a system for providing a joint for connecting a first object and a second object. The system includes a data acquisition device configured to acquire joint parameter data regarding the first object and the second object, and a controller coupled to the data acquisition device and configured to provide joint design data regarding a design of the joint based on the joint parameter data.

Another embodiment of the present disclosure relates to a method for providing joint design data for a joint configured to couple a first object to a second object. The method includes acquiring joint parameter data regarding the first object and the second object using a data acquisition device, transmitting the joint parameter data to a controller, and receiving the joint, wherein the joint is based on joint design data generated by the controller, and wherein the joint design data is based on the joint parameter data.

Another embodiment of the present disclosure relates to a method for providing joint design data for a joint configured to couple a first object to a second object. The method includes acquiring joint parameter data regarding the first object and the second object using a data acquisition device, transmitting the joint parameter data to a controller, and generating joint design data based on the joint parameter data using the controller.

Another embodiment of the present disclosure relates to a system for providing a joint for coupling a first pipe and a second pipe. The system includes a flexible coupler having a first end and a second end connected by a body, the body being malleable for approximating the joint such that the first end is coupleable to the first pipe and the second end is coupleable to the second pipe, a data acquisition device configured to acquire coupler data regarding the flexible coupler, and a controller configured to generate joint design data regarding the joint based on the coupler data.

Another embodiment of the present disclosure relates to a method for providing a joint for connecting a first pipe and a second pipe. The method includes coupling a first end of a flexible coupler to the first pipe and a second end of the flexible coupler to the second pipe, stabilizing the flexible coupler to approximate a shape of the joint, acquiring coupler data regarding the flexible coupler, providing the coupler data to a controller, and receiving the joint, wherein the joint is based on the coupler data.

Another embodiment of the present disclosure relates to a method for providing a joint for connecting a first pipe and a second pipe. The method includes coupling a first end of a flexible coupler to the first pipe and a second end of the flexible coupler to the second pipe, stabilizing the flexible coupler to approximate a shape of the joint, acquiring coupler data regarding the flexible coupler, and generating joint design data usable for producing the joint based on the coupler data.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented here.

Referring to the figures generally, various embodiments disclosed herein relate to producing joints (e.g., couplings, fittings, flanges, connectors, etc.) for coupling a first object (e.g., a first pipe) to a second object (e.g., a second pipe). A data acquisition device may acquire various types of data (e.g., joint parameter data) regarding the objects and an existing region (e.g., space, gap) between the objects. The joint parameter data can include various measurements or other data regarding the first object, the second object, a region between the first and second objects, usage data regarding an intended use or environment of the joint, and the like. Based on the joint parameter data, a controller generates data (e.g., joint design data) regarding the joint.

The joint design data can include drawings, data files, bills of materials, a part number of a catalog part, etc. In further embodiments, the controller can provide the joint design data to a joint generator (e.g., a three-dimensional printer or the like) such that the joint can be produced on-site or at a remote location.

Figure 1:
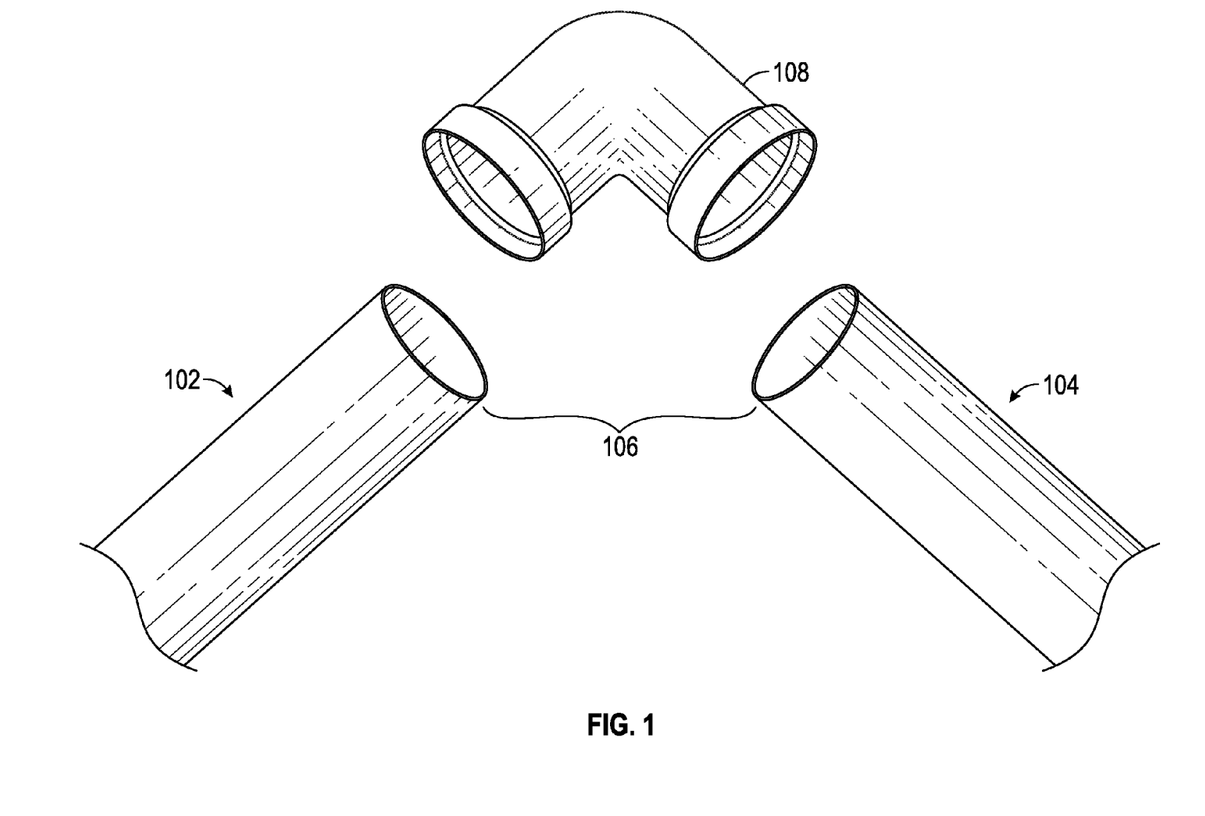
FIG. 1 is an illustration of a joint for connecting a first object to a second object, according to one embodiment.

Referring to FIG. 1, joint 108 is shown for coupling first pipe 102 (i.e., first object) to second pipe 104 (i.e., second object), according to one embodiment. In this embodiment, pipes 102 and 104 are configured to transport or exchange fluids, such as liquid or gas. Pipes 102 and 104 are "as-found" or pre-emplaced in this embodiment, such as two pipes installed for plumbing use within a home. Joint 108 is a pipe fitting configured to span space 106 between as-found pipes 102 and 104 to functionally connect (e.g., fluidly connect) pipe 102 to pipe 104. Although joint 108 is shown by way of example as an elbow joint or fitting to connect pipes 102 and 104, joint 108 may have another shape or configuration in other embodiments, as may be suitable for the particular application of joint 108. In some embodiments, joint 108 may have more than two ends for connecting more than two objects. Joint 108 may also have a custom shape or configuration for connecting objects having an unusual orientation or configuration. For instance, joint 108 may be configured to avoid obstructions between pipe 102 and pipe 104.

Figure 2:
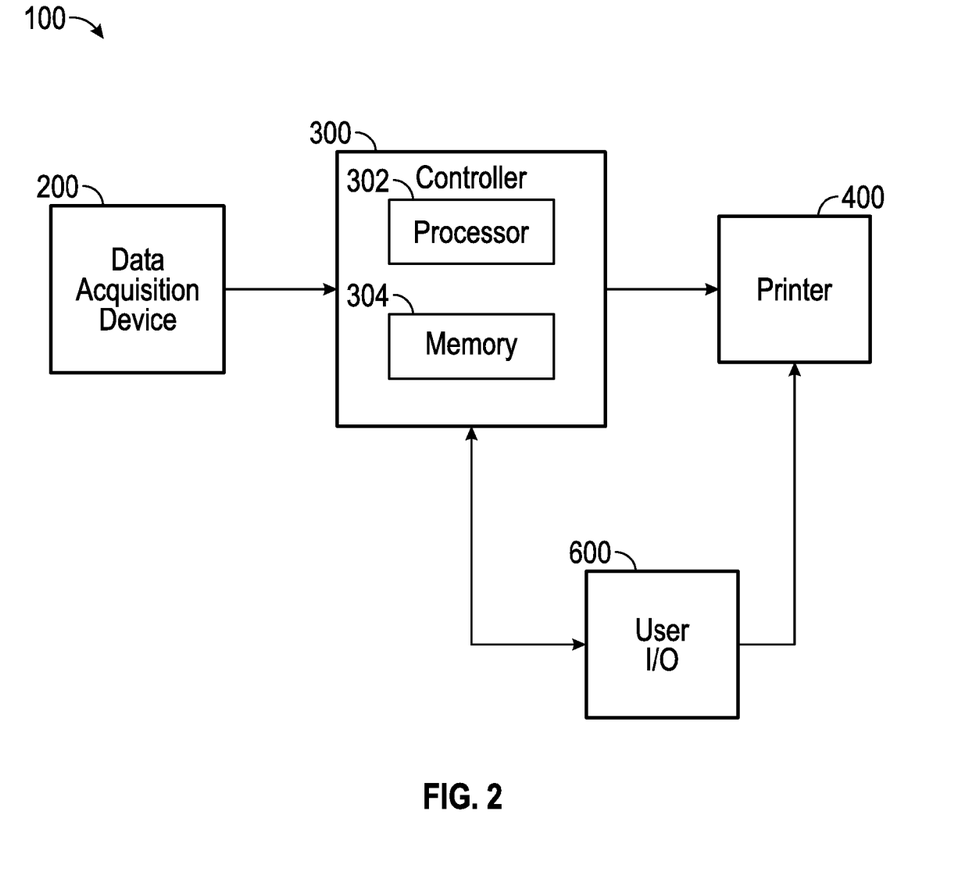
FIG. 2 is a block diagram of a system for providing a joint for coupling two objects, according to one embodiment.

Referring now to FIG. 2, system 100 for providing a joint configured to couple two or more objects is shown, according to one embodiment. The two or more objects may be pipes, conduits, cables, structural supports such as walls, studs, joists, truss elements, floors, or ceilings, or any other objects that require a joint or coupling for connecting the two or more objects. System 100 includes data acquisition device 200. Data acquisition device 200 is configured to acquire (e.g., generate, collect, etc.) joint parameter data regarding pipes 102 and 104 and gap 106 (e.g., a space or region between pipes 102 and 104), including various measurements. Data acquisition device 200 may include any number of sensors or other devices or apparatuses for acquiring the joint parameter data, such as metrology sensors, image sensors, and ultrasonic sensors. Data acquisition device 200 may be configured to acquire the joint parameter data by a number of means, including by contacting the objects, capturing images, and sending and receiving locating waves. In one embodiment, data acquisition device 200 is configured to acquire the joint parameter data by measuring first pipe 102, second pipe 104, and/or gap 106. System 100 may also include a flexible coupling joint (e.g., flexible coupler 500 shown in FIG. 6) configured to approximate the suitable joint to provide joint parameter data. The flexible coupling joint may be configured to couple to the two or more objects in order to approximate the suitable joint. In one embodiment, the flexible coupling joint is included as part of data acquisition device 200 and configured to acquire the joint parameter data. In other embodiments, the flexible coupling joint is separate from data acquisition device 200 and data acquisition device 200 is used to measure the flexible coupling joint in order to approximate the suitable joint.

The joint parameter data may include dimensions of pipe 102, pipe 104, and gap 106. For instance, the joint parameter data may include a radius of the pipe openings, a thickness of the pipe walls, or a distance or angle between pipes 102 and 104. In one embodiment, data acquisition device 200 is also configured to estimate one or more dimensions of pipes 102 and 104 and/or gap 106 based on measured dimensions and the joint parameter data includes these estimated dimensions. For instance, data acquisition device 200 may be configured to estimate a dimension of gap 106 based on measurements of pipes 102 and 104. The joint parameter data may also include features of pipes 102 and 104, such as a partition positioned on or within pipes 102 and/or 104. The data may also include a boundary condition (e.g., physical limits or boundaries) for gap 106 or for a suitable joint (e.g., joint 108) for connecting pipes 102 and 104. For instance, the boundary condition may include an obstruction located between pipes 102 and 104. For instance, the boundary condition may include specification of a joint contact surface on pipe 102 or pipe 104 which is selected to mate with joint 108. The boundary condition may include characteristics (e.g., dimensions, shape, orientation, etc.) of this joint contact surface.

Data acquisition device 200 is configured to communicate with controller 300. Data acquisition device 200 is configured to acquire (e.g., measure, estimate, determine, generate, etc.) data (e.g., joint parameter data) regarding pipes 102 and 104 and gap 106 and transmit the data to controller 300 (e.g., automatically, upon request, etc.). Controller 300 is configured to receive the data (e.g., remotely) and generate joint design data (e.g., joint geometry, dimensions of the joint, boundaries of the joint, etc.) regarding a suitable joint (i.e., suitable for coupling pipes 102 and 104) based on the joint parameter data. The joint design data may include an obstacle (e.g., obstruction) or other region between pipes 102 and 104 that the suitable joint cannot occupy, such as a wall or other permanent object. The joint design may be determined based on any obstacles or obstructions between pipes 102 and 104, such as to avoid an obstacle or obstruction. The joint design data may also include other boundary conditions of pipes 102 and 104 and/or gap 106. In one embodiment, controller 300 is configured to determine one or more negative spaces (e.g., space around and between pipes 102 and 104) based at least in part on the joint parameter data and the joint design data may be based on or include the negative spaces. In this embodiment, the joint design data may be generated or provided such that the suitable joint avoids or occupies the negative spaces when connected to first pipe 102 and second pipe 104.

In one embodiment, controller 300 is configured to determine a joint design (e.g., custom joint design) for the suitable joint based on the joint parameter data and/or the joint design data. For instance, controller 300 may design a custom joint configured to couple two or more objects (e.g., pipe 102 to pipe 102). The custom joint design may include a bill of materials for producing or manufacturing the suitable joint. In another embodiment, controller 300 is configured to select a suitable joint from a database (e.g., a catalog of parts) including a plurality of joint designs (e.g., available joints) based on the joint parameter data and/or the joint design data. The suitable joint may be selected to functionally connect pipes 102 and 104. In this embodiment, if a suitable joint is not available for selection, controller 300 may determine a custom joint design based on the joint parameter data. Controller 300 includes processor 302 which may be used to receive and process the data, and memory 304 which may store the data, the joint designs, the database or catalog of joint designs, or any other information as may be desirable.

Controller 300 is configured to communicate with a joint generator such as printer 400. Printer 400 may be a three-dimensional (3D) printer. Printer 400 is configured to receive the joint design data and/or a suitable joint design (e.g., custom joint design, selected joint design, etc.) and print a suitable joint based on the data and/or design. The suitable joint may be configured to functionally connect pipes 102 and 104, such as to fluidly connect pipes 102 and 104, prevent leaks at the suitable joint, or otherwise perform a function of pipes 102 and 104. In one embodiment, the suitable joint includes a first mating surface for connecting to pipe 102 and a second mating surface for connecting to pipe 104. The suitable joint may be configured to provide physical support for pipes 102 and 104 when connected to pipes 102 and 104. Printer 400 may also request and receive additional data from a user of system 100 and/or from controller 300 (e.g., via user input/output device 600) in order to print the suitable joint. Printer 400 is configured to request and receive data from the user via user input/output (I/O) device 600. Printer 400 may include a processor for receiving and processing the data and designs to print or generate the suitable joint. Printer 400 may also include a memory device for storing the joint design data, designs, and any other data or information as may be desirable.

Figure 3:
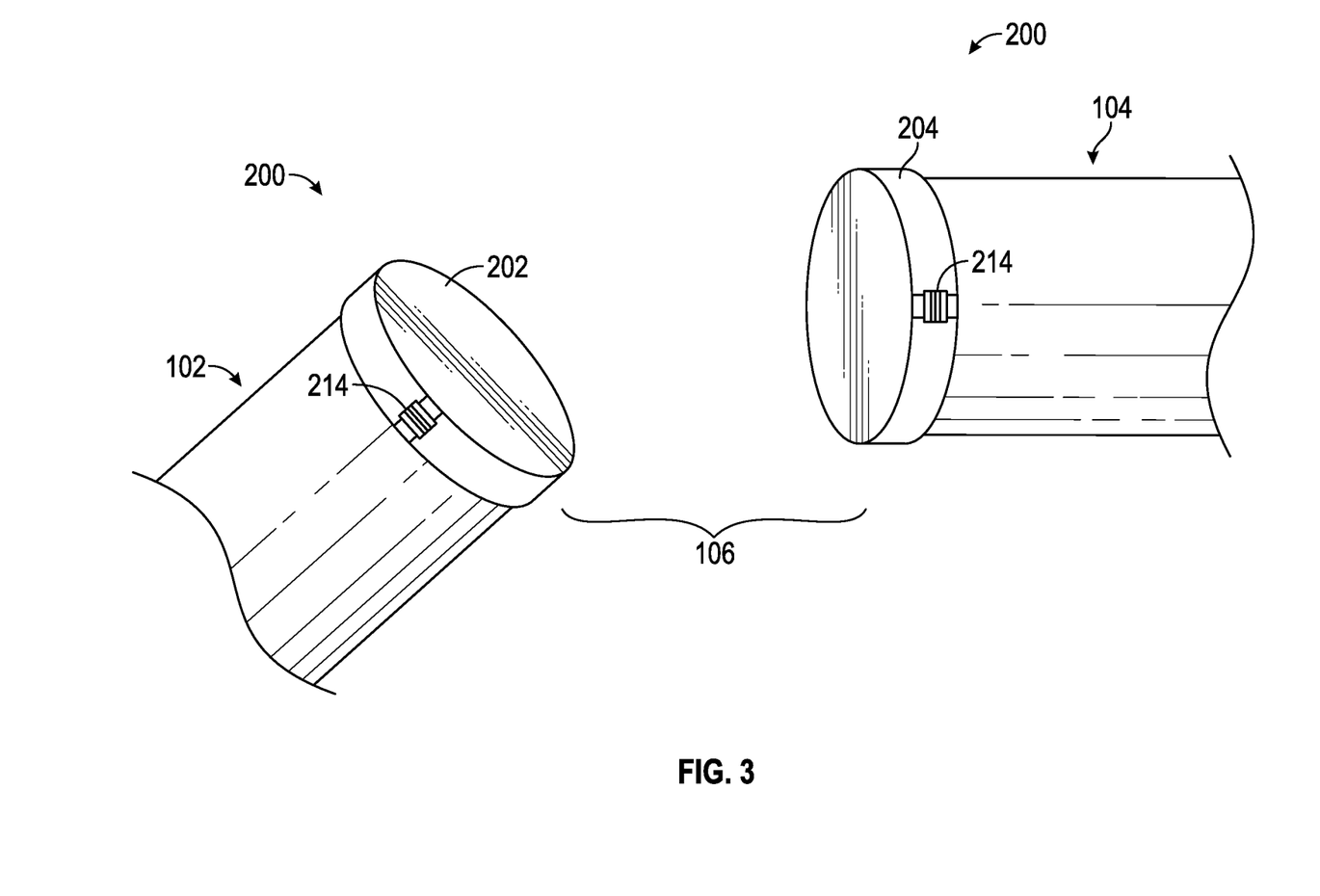
FIG. 3 is an illustration of a data acquisition device coupled to two objects, according to one embodiment.

Referring now to FIG. 3, data acquisition device 200 includes metrology sensors 202 and 204 (e.g., magnetic sensors, acceleration sensors, orientation sensors, optical sensors, etc.) for measuring pipes 102 and 104, according to one embodiment. In this embodiment, first metrology sensor 202 is removably coupled to an open end of first pipe 102 and second metrology sensor 204 is removably coupled to an open end of second pipe 104. In this embodiment, metrology sensors 202 and 204 have a disc-like shape and are configured to fit the ends of pipes or other objects requiring a suitable joint. In some embodiments, metrology sensors 202 and 204 are adjustable to fit objects of varying sizes. For instance, metrology sensors 202 and 204 may include a sizing feature (e.g., adjustable clasp 214) for accommodating objects of varying sizes. In one embodiment, an inner radius of the metrology sensor is adjustable to clamp the metrology sensor to pipes 102 and 104, as well as other objects of varying sizes. Metrology sensors 202 and 204 may include other attachment features in other embodiments, such as clips or snap-fit portions, for attaching metrology sensors 202 and 204 to other objects. In one embodiment, metrology sensors 202 and 204 are made from a rubber or other elastic material such that metrology sensors 202 and 204 are configured to conform to the shape of pipes 102 and 104 and couple to pipes 102 and 104.

In FIG. 3, metrology sensors 202 and 204 are coupled to pipes 102 and 104 to acquire joint parameter data for providing a suitable joint. In one embodiment, metrology sensors 202 and 204 are configured to send signals (e.g., magnetic fields, microwaves, optic transmissions, ultrasound waves, etc.) to each other when attached to pipes 102 and 104 in order to determine a relative position of sensors 202 and 204, such as a location and an angle of each sensor 202 and 204. In this embodiment, metrology sensors 202 and 204 may be configured to measure gap 106 by determining a position (i.e., a location and/or orientation) of first sensor 202 relative to second sensor 204 (i.e., a first sensor location and a first sensor orientation) and a position (i.e., a location and/or orientation) of sensor 204 relative to sensor 202 (i.e., a second sensor location and a second sensor orientation), such as when sensor 202 is coupled to pipe 102 and sensor 204 is coupled to pipe 104. Sensors 202 and 204 may be configured to measure a separation (e.g., six degrees of freedom of positional information of each sensor 202 and 204) between sensor 202 and 204 by sending and receiving signals to and from each other. Data collected by metrology sensors 202 and 204 (e.g., joint parameter data) may be sent to controller 300 and used by controller 300 to generate joint design data and/or determine a suitable joint.

Metrology sensors 202 and 204 may also be configured to measure one or more physical characteristics or conditions of pipes 102 and 104, such as a size of pipes 102 and 104 (e.g., a circumference or radius of a pipe opening, a length of a pipe, a pipe wall thickness) or other characteristics or features of pipes 102 and 104, such as internal partitions of pipes 102 and 104. Metrology sensors 202 and 204 may measure or acquire dimensions or data regarding pipes 102 and 104 by contacting pipes 102 and 104. Metrology sensors 202 and 204 may determine a wall thickness of pipe 102 or 104, for instance, by attaching or being clipped to the wall of pipe 102 or 104. In one embodiment, metrology sensors 202 and 204 each include an array of contact sensors and measure the dimensions of pipes 102 and 104 by detecting points of contact between pipes 102 and 104 and individual contact sensors of the respective arrays. In one embodiment, metrology sensors 202 and 204 measure a size of a pipe opening by recording any adjustments required to attach to pipes 102 and/or 104. In another embodiment, metrology sensors 202 and 204 are configured to estimate a material composition of pipes 102 and/or 104 by contacting pipes 102 and/or 104, such as by measuring a response to physical contact or a generated signal.

In one embodiment, a single metrology sensor may be configured to measure pipe 102 and/or 104 and determine a dimension of gap 106 by contacting pipes 102 and 104. For instance, the metrology sensor may be configured to measure pipes 102 and 104 and/or determine a dimension of gap 106 by determining a location and an orientation of a reference (e.g., pipe 102 or 104, a separate reference object, an earlier position of the metrology sensor, etc.) relative to the metrology sensor. For instance, a metrology sensor may be positioned to contact first pipe 102 and an external reference may be positioned adjacent to the metrology sensor. The location and orientation of the reference may then be determined relative to the metrology sensor. The metrology sensor may then be positioned to contact second pipe 104 and the location and orientation of the metrology sensor may again be determined relative to the external reference. This data may be included as part of the joint parameter data and sent to controller 300. The external reference may be placed in order to identify one or more boundary conditions of gap 106 and/or one or more negative spaces within gap 106 and between pipes 102 and 104. The location and orientation of the reference may be acquired or measured based on a six degrees of freedom measurement (i.e., three components of locational data and three components of orientational data) of metrology sensor 202 or 204 when coupled to or contacting pipe 102 or 104. In one embodiment, metrology sensors 202 and 204 are configured to measure pipes 102 and 104 and/or gap 106 by contacting the pipe 102 and pipe 104 in a designated sequence. The designated sequence may be adjustable by a user of system 100.

In one embodiment, the metrology sensors (e.g., metrology sensors 202 and 204) are magnetic sensors configured to identify a reference and determine a location and/or orientation of the reference relative to the magnetic sensors via a magnetic field. In another embodiment, the metrology sensors are optical sensors configured to identify the reference and determine a location and/or orientation of the reference relative to the optical sensors via an optical transmission. In another embodiment, the metrology sensors are ultrasonic sensors configured to identify the reference and determine a location and/or orientation of the reference relative to the ultrasonic sensors via an ultrasound wave. In another embodiment, the metrology sensors include accelerometers and/or inclinometers or gyroscopic sensor configured to determine a change in location and/or orientation resulting from motion of the metrology sensor. In some embodiments, the metrology sensors can include multiple accelerometers configured to detect accelerations along multiple axes, or to detect angular motions via differential accelerations sensed at different locations within the metrology sensor.

In one embodiment, data acquisition device 200 includes image sensor 206 (shown in FIG. 3). Image sensor 206 may be a camera or other optical sensor configured to capture images of pipes 102 and 104 and/or gap 106. In one embodiment, data acquisition device 200 is configured to acquire or measure one or more dimensions of pipes 102 and/or 104, or to estimate gap 106 based at least in part on the images. In another embodiment, data acquisition device 200 is configured to send the images to controller 300 and controller 300 is configured to generate joint design data and/or determine a suitable joint design based on the images. In one embodiment, data acquisition device 200 is configured to measure a distance to pipe 102 or 104 (e.g., by acquiring stereo images, by determining a focal quality, by using a range sensor, etc.). In one embodiment, controller 300 can determine a dimension of pipe 102 or 104 by combining distance information to pipe 102 or 104 with angular information from a captured image of pipe 102 or 104. In one embodiment, controller 300 can determine a relative orientation of pipes 102 and 104 relative to image sensor 206 by determining relative sizes of image features (e.g., the apparent distortion of a circular opening in pipe 102 to an elliptical shape can be used to determine both the inclination and azimuth of pipe 102's orientation relative to image sensor 206.

Figure 4:
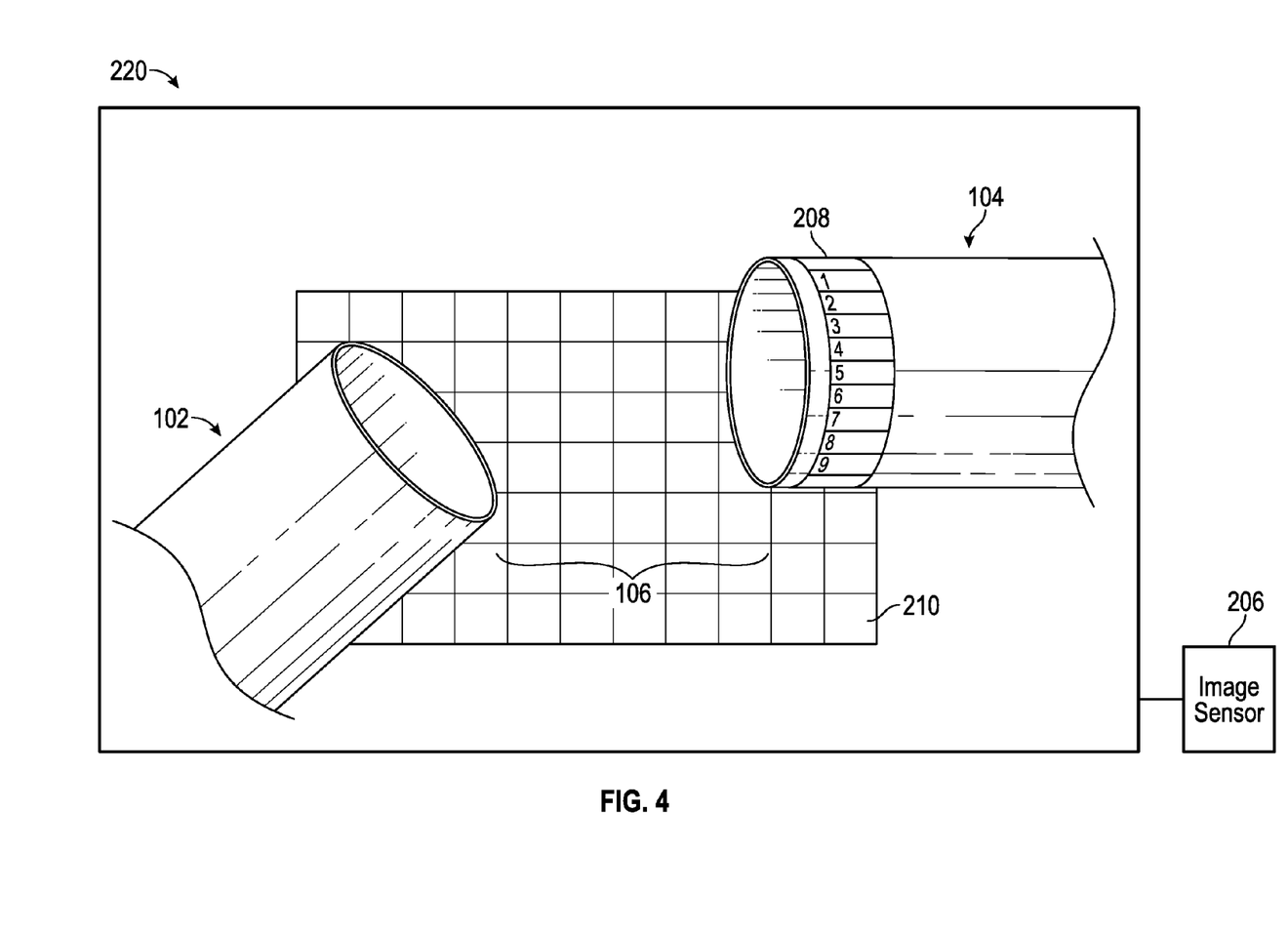
FIG. 4 is an illustration of an image for determining the suitable joint, according to one embodiment.

Referring now to FIG. 3, an example image 220 is shown, according to one embodiment. In this embodiment, reference 208 (e.g., stamp, grid, tape, etc.) is captured within image 220 to provide a reference or context (e.g., scale) for determining a measurement or dimension of pipes 102 and/or 104. Reference 208 may be coupled to one or both of pipes 102 and 104 or otherwise positioned (e.g., adjacent to pipes 102 or 104) such that reference 208 is captured within image 220 by image sensor 206. In the illustrated embodiment, reference 208 is a scale coupled to pipe 104 and intended to provide a measurement for a viewer or processor of image 220. The scale may include markers or other indicators that represent known measurements in order to estimate or calculate dimensions of pipes 102 and 104. In this embodiment, the image also includes second reference 210. Reference 210 is a grid positioned behind pipes 102 and 104 and intended to provide a measurement for one or more dimensions of pipes 102 and 104. In other embodiments, references 208 and/or 210 may be a stamp placed on one of pipes 102 or 104, or may be another similar reference configured to convey an aspect of pipes 102 and 104 and/or gap 106.

In one embodiment, at least one of the images captured by image sensor 206 includes reference 208. In another embodiment, at least one of the images captured by image sensor 206 includes reference 210, such as to convey another dimension of pipes 102 and/or 104. Reference 210 may be similar to or substantially different from reference 208. In one embodiment, an image includes both references 208 and 210. Images including both pipes 102 and 104 and any of references 208 and 210 may be used to determine a relative location and/or orientation of pipes 102 and 104 with respect to any common references 208 and/or 210, or vice versa. In one embodiment, the images and other related data (e.g., joint parameter data) are sent to controller 300 and controller 300 is configured to generate joint design data (e.g., one or more dimensions of pipes 102, 104 and gap 106) based on the images and other data. Controller 300 may also be configured to determine a suitable joint design based on the joint data. In another embodiment, data acquisition device 200 (e.g., image sensor 206) is configured to acquire one or more dimensions of pipes 102 and 104 based on the images and send the dimensions as joint parameter data to controller 300. Controller 300 may then generate joint design data or determine a suitable joint design based on the data (e.g., the determined dimensions, the images, etc.).

In one embodiment, image sensor 206 is part of a mobile communications device (e.g., cellular phone, smart phone, tablet, etc.) configured to capture an image and send the image as data to controller 300. In this embodiment, controller 300 may be coupled to image sensor 206 as part of the mobile device. For instance, the mobile device may include a phone application for determining the suitable joint design. The phone application may be configured to capture an image of pipes 102 and/or 104 with image sensor 206 and automatically determine a suitable joint design (e.g. by controller 300) based on the image. If controller 300 is unable to determine a suitable joint design based on the image, controller 300 may request an additional image (e.g., via a message sent through the phone application) or request that a user of the mobile device manually enter additional information (e.g., via an input of the mobile device). Image sensor 206 may include inertial sensors to determine a change in location or orientation of image sensor 206 between capturing each of the images. Location or orientation information may be recorded for each image and sent to controller 300 as part of the joint parameter data (e.g., along with the images). In one embodiment, inertial sensors within the mobile device are utilized and coupled to controller 300 in order to receive position data (e.g., location and/or orientation) from the sensors.

In one embodiment, references 208 and 210 are plugs that thread and/or slip into the ends of pipes 102 and 104 before capturing the images. The plugs may be threaded or otherwise configured to fit pipes 102 and 104. The plugs may be coded for each common pipe size, such as being striped or gridded, so that one or more dimensions may be easily identified within the images (e.g., by controller 300, by a user of system 100, etc.). The plugs may provide a size, scale, and/or alignment reference for acquiring joint parameter data (e.g., determining one or more dimensions of pipes 102 and 104, and/or gap 106). In one embodiment, data acquisition device 200 is configured to determine which of the plugs is present within the one or more images in order to calculate or determine one or more measurements of pipes 102 and 104 and/or to estimate one or more dimensions of gap 106. In another embodiment, the plugs are readable by controller 300, such as via a computer program or image processor. For instance, controller 300 may include a program for reading the images and determining the plug within each pipe 102 and 104, such as to determine one or more dimensions of a suitable joint. The plugs may resolve any ambiguities within the images caused by reflectiveness of pipes 102 and 104, such as when pipes 102 and/or 104 are made from a polished chrome or stainless steel. In one embodiment, system 100 includes two plugs for fitting within pipes 102 and 104 in order to measure one or more dimensions of pipes 102 and 104.

Controller 300 may be configured to determine a position of reference 208 (i.e., a first reference position) and/or a position of second reference 210 (i.e., a second reference position) based at least in part on the images. Controller 300 may also be configured to determine one or more measurements or dimensions of pipes 102 and 104 and/or gap 106 based at least in part on the images and/or the positions of references 208 and/or 210. In one embodiment, controller 300 determines boundary conditions (e.g., joint design data) for a suitable joint based on the images and determines a joint design (e.g., suitable joint design) for connecting pipes 102 and 104 based on the boundary conditions. In another embodiment, controller 300 selects a suitable joint design from a database based on the boundary conditions. In still another embodiment, controller 300 provides a bill of materials for manufacturing a suitable joint. Controller 300 may also provide blueprints or designs for flanges, custom couplers, and/or threaded plastic pieces for connecting pipes 102 and 104 based on the images from image sensor 206, including any boundary conditions calculated or estimated by controller 300.

Figure 5:
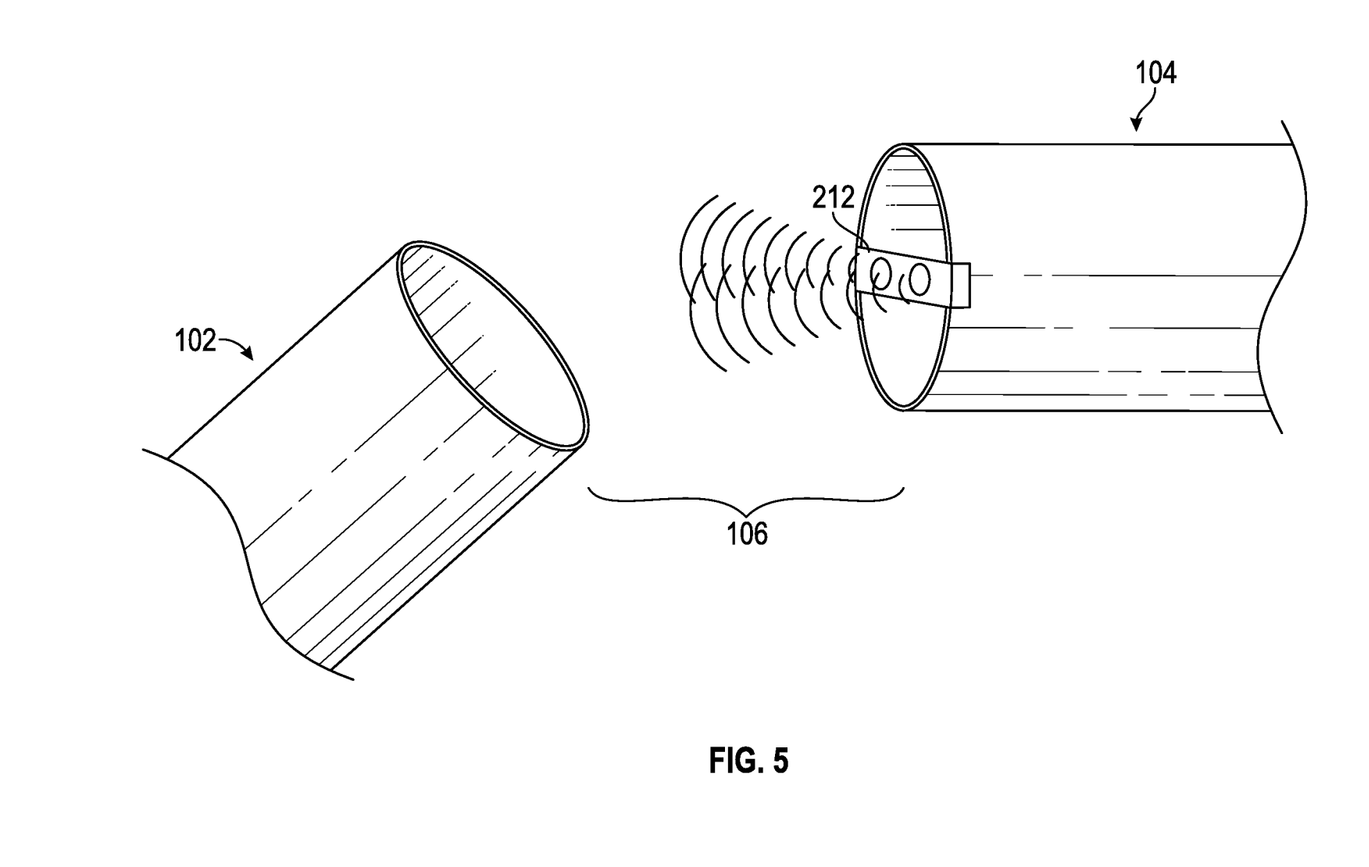
FIG. 5 is an illustration of a flexible coupler coupled to two objects for approximating a coupling joint, according to one embodiment.

Referring now to FIG. 5, data acquisition device 200 is shown to include ultrasonic sensor assembly 212, according to one embodiment. Ultrasonic sensor assembly 212 may be configured to send one or more ultrasound waves (e.g., toward pipes 102 or 104, toward a reference, etc.) and receive the echoes. Information related to the waves may be sent to controller 300 as data (e.g., joint parameter data) and controller 300 may generate joint design data and determine a joint design based on the data. In one embodiment, data acquisition device 200 (e.g., ultrasonic sensor assembly 212) is configured to interpret the echoes from the ultrasound waves to produce ultrasonic images. The ultrasonic images may be sent to controller 300 to generate joint design data. In another embodiment, controller 300 may be configured to produce the ultrasonic images based on the data. In one embodiment, ultrasonic sensor assembly 212 includes two ultrasonic sensors, with one ultrasonic sensor coupled to each of pipes 102 and 104. In this embodiment, each of the ultrasonic sensors is configured to send ultrasound waves toward the other ultrasonic sensor, collecting data related to the waves (e.g., a reflection angle, a reflection time, etc.) and sending the data to controller 300. Controller 300 may be configured to determine one or more dimensions of pipes 102 and 104 or boundary conditions of gap 106 based on the data, which may be used to generate joint design data or determine a suitable joint design. In another embodiment, ultrasonic sensor assembly 212 includes a single ultrasonic sensor that may be coupled to one of the two or more objects. In this embodiment, the ultrasonic sensor is configured to send one or more waves in the direction of the other objects so that the waves are reflected by the other objects and received by the ultrasonic sensor. The ultrasonic sensor may be configured to collect or acquire any data related to the waves and send the data to controller 300. Controller 300 is configured to use the data to determine joint design data and/or a suitable joint design. Controller 300 may also be configured to use the data to produce one or more ultrasonic images.

Figure 6:
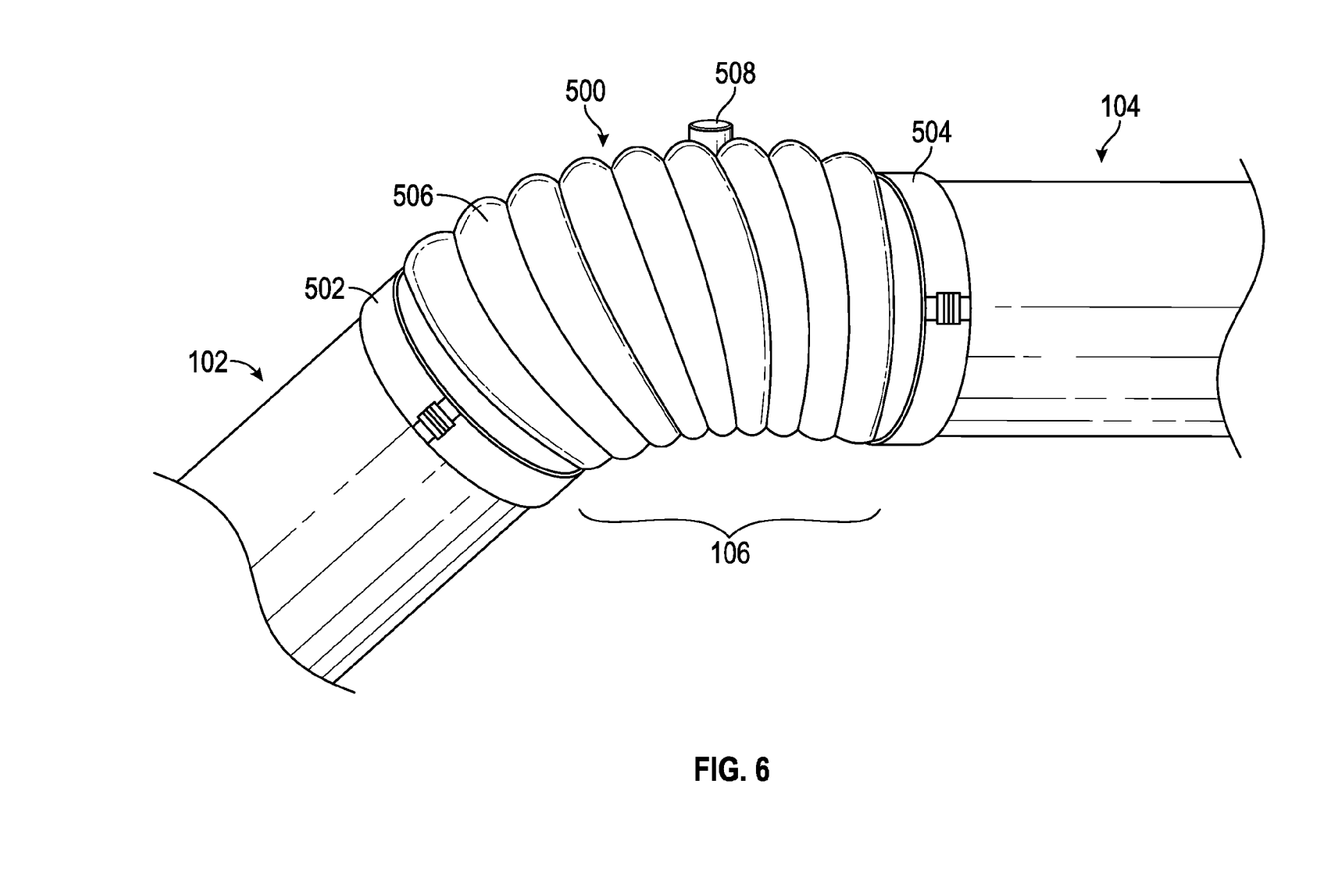
FIG. 6 is an illustration of an ultrasonic sensor assembly coupled to an object, according to one embodiment.

Referring now to FIG. 6, flexible coupler 500 is shown coupled to pipes 102 and 104, according to one embodiment. Flexible coupler 500 is intended to approximate a suitable joint by coupling (e.g., attaching or connecting) to first pipe 102 and second pipe 104. A suitable joint design may then be determined (e.g., calculated, estimated, etc.) based on measurements of flexible coupler 500 (e.g., coupler data). In this embodiment, flexible coupler 500 includes first end 502 connected to second end 504 by body 506. Flexible coupler 500 is configured to approximate the suitable joint by coupling first end 502 to first pipe 102 and second end 504 to second pipe 104. In one embodiment, ends 502 and 504 are adjustable to approximate fluid openings at the ends of pipes 102 and 104, respectively. Body 506 is malleable for approximating the suitable joint. Flexible coupler 500 may be made from rubber, fabric, adjustably interconnected rings, or another flexible material suitable for connecting ends 502 and 504 to pipes 102 and 104, respectively. Flexible coupler 500 may be reusable to approximate a plurality of suitable joints. In one embodiment, flexible coupler 500 includes more than two ends in order to approximate a joint for connecting more than two objects (e.g., pipes).

In one embodiment, data acquisition device 200 is configured to measure flexible coupler 500 and acquire coupler data (e.g., one or more dimensions of data acquisition device 200) based on flexible coupler 500. Data acquisition device 200 may be portable in this embodiment. Data acquisition device 200 may be configured to measure flexible coupler 500 as connected to first pipe 102 and second pipe 104 and/or separately from first pipe 102 and second pipe 104. In one embodiment, flexible coupler 500 is configured to selectively stabilize (e.g., in response to user manipulation) to approximate the shape of the suitable joint, such as when connected to pipes 102 and 104. Flexible coupler 500 may include actuator 508 which may be pressed to stabilize (i.e., actuate) flexible coupler 500. When stabilized, flexible coupler 500 is more easily removable from pipes 102 and 104 so that data acquisition device 200 can acquire coupler data (e.g., measure flexible coupler 500). In another embodiment, flexible coupler 500 can be stabilized by a sprayable or paintable glue, which may be selected to be removable after data acquisition device 200 has acquired coupler data to permit subsequent reuse of flexible coupler 500.

Data acquisition device 200 is configured to send the data to controller 300. Data acquisition device 200 may be physically coupled to controller 300 or otherwise communicatively coupled and configured to send the data remotely to controller 300. Controller 300 is configured to receive the data and generate joint design data regarding a suitable joint based on the coupler data. Controller 300 may also be configured to determine a joint design for producing a suitable joint based at least in part on the data. For instance, controller 300 may be configured to determine one or more dimensions of pipes 102 and 104 and/or gap 106 based on the coupler data. The coupler data may include an adjusted size of ends 502 and 504, an orientation of ends 502 and 504 and body 506, a position of ends 502 and 504 and body 506 relative to each other, or any other information related to flexible coupler 500 and suitable for determining a suitable joint. In one embodiment, controller 300 is configured to determine a suitable joint design for functionally connecting pipes 102 and 104 based on the coupler data. As described above, system 100 may include printer 400 for printing the suitable joint. Printer 400 is configured to receive the joint design data and/or a joint design (e.g., from controller 300) and print a suitable joint based on the data and/or the joint design, such as by an automatic additive process. In one embodiment, printer 400 is configured to receive or interpret flexible coupler 500, such as by identifying and measuring flexible coupler 500 independent of data acquisition device 200, and determine the a joint design based on flexible coupler 500.

Data acquisition device 200 may include sensors or other apparatuses for measuring flexible coupler 500, such as those described previously. For instance, data acquisition device 200 may include an image sensor configured to measure flexible coupler 500 by capturing one or more images of flexible coupler 500. The image sensor may be similar to image sensor 206. In one embodiment, the image sensor (i.e., data acquisition device 200) is configured to send the images (i.e., data) to controller 300 for controller 300 to determine the suitable joint design. Controller 300 may also generate one or more boundary conditions of the suitable joint and/or gap 106 (e.g., joint design data) based on the images. Controller 300 may be configured to generate joint design data based on images including flexible coupler 500 attached to pipes 102 and 104 and/or based on images of flexible coupler 500 separate from (i.e., not connected to) pipes 102 and 104. System 100 may also include a reference (e.g., reference 208) for capturing within the image. Controller 300 may be configured to determine the suitable joint design based at least in part on the reference (e.g., a position of reference relative to flexible coupler 500).

The image sensor may be a camera or another type of optical sensor. In one embodiment, the image sensor is part of a mobile communications device (e.g., a camera phone). The mobile device may include a phone application for measuring flexible coupler 500 and determining the suitable joint design similar to the phone application described previously. In this embodiment, the image sensor may be configured to capture an image of flexible coupler 500 and send the image remotely to controller 300 via the phone's cellular network. Controller 300 may be included as part of the camera phone and configured to generate joint design data and/or a suitable joint design automatically. In one embodiment, the camera phone captures an image and sends the image to controller 300 as part of a phone application. For instance, the phone application may receive the image and be programmed or configured to (automatically) determine a suitable joint design based on the image. The camera phone may send the suitable joint design to a 3D printer such as printer 400 for printing the suitable joint.

Data acquisition device 200 may also include a coordinate measuring machine configured to measure physical characteristics of flexible coupler 500 and send data associated with the physical characteristics to controller 300 for determining the suitable joint design. In one embodiment, the coordinate measuring machine includes a probe (e.g., a touch probe, an optical probe, a laser probe, a white light probe, etc.) for measuring physical characteristics of flexible coupler 500. In one embodiment, the coordinate measuring machine is substantially stationary and configured to measure flexible coupler 500 as removed from pipes 102 and 104 (e.g., when flexible coupler 500 is stabilized). The coordinate measuring machine may also be configured to measure flexible coupler 500 as connected to pipes 102 and 104, such as by positioning the probe proximate to flexible coupler 500. The coordinate measuring machine may be configured to measure positions at multiple sites of flexible coupler 500, such as to determine any boundaries of the suitable joint.

Referring again to FIG. 1, printer 400 is a 3D printer configured to produce or make a solid 3D object from a digital model (e.g., a custom coupling design). Printer 400 may be configured to produce the suitable joint using an automatic additive process, fusing joined layers of printed material (e.g., thermoplastics, metal alloys, metal powders, ceramic powders, photopolymers, etc.) to form the suitable joint. The automatic additive process may include stereolithography, which may be used to produce a solid part from a liquid polymer. In one embodiment, controller 300 calculates or otherwise determines a custom joint design based on data received from and/or acquired by data acquisition device 200. In one embodiment, controller 300 determines joint design data such that the joint is custom designed to transition between two boundary conditions (e.g., to form mating surfaces on either end of the joint based on the size and shapes of selected joint contact surfaces on respective objects to be joined to the mating surfaces). Controller 300 can receive data regarding the relative position (location and/or orientation) of the two joint contact surfaces, and custom design the joint to transition (or morph) between the two mating surfaces. Controller 300 can base this transition upon constraints such as allowable bend radii, allowable abruptness of the transition, minimum or maximum cross-sections, allowable material usage, joint stress, effects on turbulence or pressure losses on fluid flow through the joint, etc. In one embodiment, printer 400 may be configured to produce a custom joint based on a custom joint design or joint design data. For instance, printer 400 may be configured to communicate with controller 300, receiving a custom joint design and/or joint design data via a signal from controller 300. In one embodiment, controller 300 includes a memory device for storing the custom joint design and joint design data. In this embodiment, one or more custom joint designs may be stored on memory 304 and uploaded or sent to printer 400 in order to produce one or more custom joints. Printer may also include a memory device similar to memory 304 and configured to store data and joint designs.

In another embodiment, controller 300 is configured to select a joint design (i.e., a selected joint design, a selected joint) from a database including a plurality of joint designs based on the coupler data and/or the joint design data. In this embodiment, printer 400 is configured to receive the selected joint design (e.g., from controller 300) and produce the selected joint based on the design. In this embodiment, controller 300 may be configured to select from the database a joint design that best fits or connects pipes 102 and 104 (e.g., accommodates or fits the dimensions of gap 106) based on the data collected and/or calculated by data acquisition device 200. Printer 400 is configured to receive the selected joint design and print a suitable joint for connecting pipes 102 and 104 based on the design. If controller 300 determines that none of the joints within the database are suitable for functionally connecting pipes 102 and 104, controller 300 may be configured to generate a custom joint design in this embodiment. Printer 400 may then produce a custom joint based on the custom joint design.

Printer 400 may be located on site, such as being physically coupled to controller 300 and/or data acquisition device 200. In one embodiment, printer 400 is remotely located. In this embodiment, the suitable joint design may be sent remotely to printer 400. For instance, printer 400 may be operated by a third party and the suitable joint design may be sent to the third party (e.g., by controller 300) for producing the suitable joint. The suitable joint design may also be stored on a memory device (e.g., a portable memory device, memory 304, etc.), then transported and physically inputted to printer 400 for producing the suitable joint based on the joint design.

Controller 300 may also be used to control one or more components of system 100 (e.g., data acquisition device 200, flexible coupler 500, printer 400, etc.), as well as to perform any calculations, functions or processes of system 100 described above. Controller 300 may be a component of the system 100 or an independent component configured to wirelessly control system 100. Memory 304 stores programming instructions that, when executed by processor 302, control the operations of system 100, including determining the suitable joint design for connecting first pipe 102 and second pipe 104. In one embodiment, processor 302 is included as part of a processing circuit also including memory 304. Processor 302 may be implemented as a general-purpose processor, an application specific integrated circuit (ASIC), one or more field programmable gate arrays (FPGAs), a digital-signal-processor (DSP), a group of processing components, or other suitable electronic processing components. Memory 304 is one or more devices (e.g., RAM, ROM, Flash Memory, hard disk storage, etc.) for storing data and/or computer code for facilitating the various processes described herein. Memory 304 may be or include non-transient volatile memory or non-volatile memory. Memory 304 may include database components, object code components, script components, or any other type of information structure for supporting the various activities and information structures described herein. Memory 304 may be communicably connected to processor 302 and provide computer code or instructions to processor 302 for executing the processes described herein.

Controller 300 is in electrical communication with various components of system 100 such as data acquisition device 200, which may be or include metrology sensors 202 and 204, image sensor 206, ultrasonic sensor assembly 212, and flexible coupler 500, as well as printer 400. Controller 300 may be physically connected to each of the components of system 100 or controller 300 may be connected to one or more of the components of system 100 by a remote (e.g., wireless) connection.

In one embodiment, controller 300 is programmed or otherwise configured to receive data associated with two objects and generate joint design data regarding a joint for coupling the two objects. Controller 300 may also be configured to determine a design for a suitable joint to connect the two objects based on the data. In other embodiments, controller 300 may be configured to measure pipes 102 and 104, gap 106, and/or flexible coupler 500 and generate data for determining a suitable joint design. Controller 300 may also be configured to communicate with any other components of system 100 and perform any functions described above related to system 100. In one embodiment, controller 300 is programmed to store or record any data associated with system 100, any signals or commands sent or received, or any other information related to system 100 within memory 304 to be available for upload. The information may be stored as a data file.

Controller 300 receives operational electrical power from a power supply. In one embodiment, the power supply provides power to controller 300 and all components of system 100, including the data acquisition device. The power supply may be any suitable power source, including, but not limited to, a solar power source, grid power, or a combination thereof. In arrangements where the power supply includes a rechargeable battery, the battery may be charged during operation through another power source (e.g., a solar panel, etc.).

Figure 7:
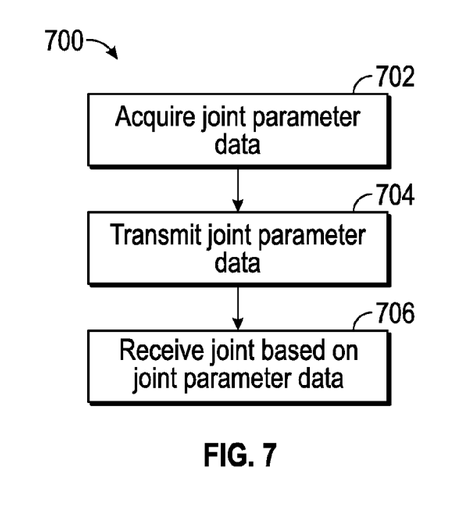
FIG. 7 is a flow chart illustration of a process for providing joint design data for a joint configured to couple two objects, according to one embodiment.

Referring now to FIG. 7, flow chart 700 shows a process for providing joint design data for a joint (e.g., joint 108) configured to couple a first object (e.g., pipe 102) to a second object (e.g., pipe 104), according to one embodiment. At 702, joint parameter data is acquired (e.g., by data acquisition device 200) regarding the objects. The joint parameter data may also be based on an area between the objects (e.g., gap 106). At 704, the joint parameter data is transmitted to controller 300. Controller 300 may use the joint parameter data to determine joint design data and/or determine a suitable joint for coupling the first object to the second object. Controller 300 may be controlled or operated by a third party. The joint parameter data may be transmitted remotely to controller 300. At 706, the joint is received. The joint may be based on joint design data generated by controller 300. The joint design data may be based on the joint parameter data.

Figure 8:
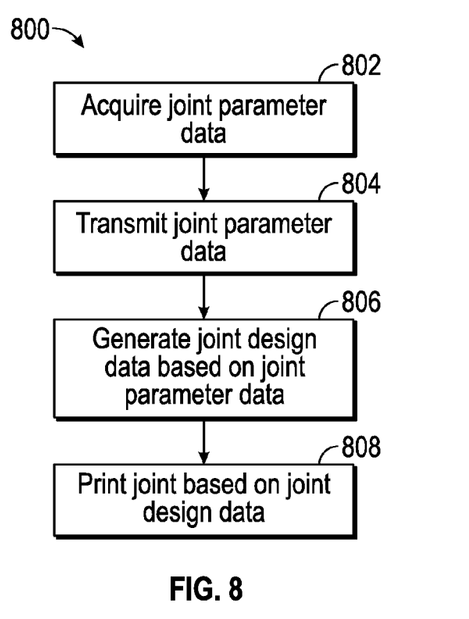
FIG. 8 is flow chart illustration of another process for providing joint design data for a joint configured to couple two objects, according to one embodiment.

Referring now to FIG. 8, flow chart 800 shows another process for providing joint design data for a joint (e.g., joint 108) configured to couple a first object (e.g., pipe 102) to a second object (e.g., pipe 104), according to one embodiment. At 802, joint parameter data is acquired (e.g., by data acquisition device 200) regarding the objects. The joint parameter data may also be based on an area between the objects (e.g., gap 106). At 804, the joint parameter data is transmitted to controller 300. At 806, joint design data is generated based on the joint parameter data and using controller 300. The joint design data may be used to provide a joint design (e.g., a custom joint design, a suitable joint, etc.). At 808, a suitable joint may be printed (e.g., by printer 400) based on the joint design data and/or the joint design. The joint may be printed on-site (e.g., at or near the objects) or the joint may be printed remotely by a third party. The joint may be printed using an additive manufacturing process.

Figure 9:
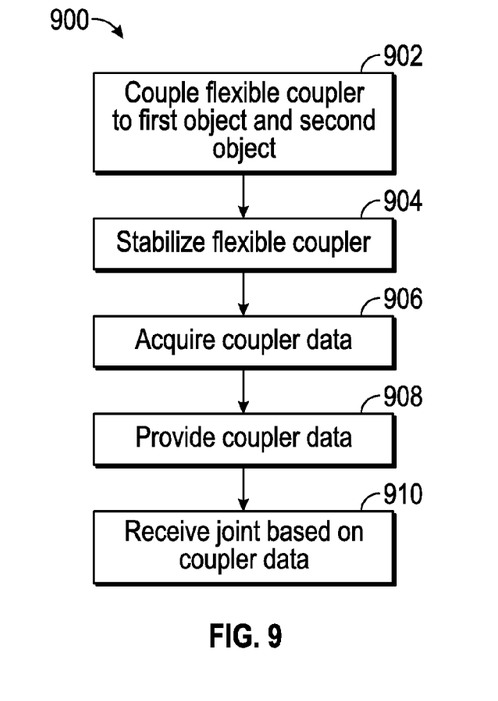
FIG. 9 is flow chart illustration of a process for providing a joint for connecting a first pipe to a second pipe, according to one embodiment.

Referring now to FIG. 9, flow chart 900 shows a process for providing a joint for connecting a first object and a second object (e.g., pipes 102 and 104), according to one embodiment. At 902, flexible coupler 500 is connected to the objects. In one embodiment, first end 502 is connected to a first object (e.g., pipe 102) and second end 504 is connected to a second object (e.g., pipe 104). Ends 502 and 504 may be adjusted to fit the first object and the second object, respectively. At 904, flexible coupler 500 is stabilized (e.g., hardened or stiffened to maintain a particular shape). In one embodiment, flexible coupler 500 is stabilized in response to manipulation by a user. In this embodiment, flexible coupler 500 may be actuated (e.g., by pressing actuator 508) to stabilize flexible coupler 500 when connected to the two objects. When stabilized, flexible coupler 500 may maintain a configuration or shape to approximate the suitable joint. At 906, coupler data is acquired regarding flexible coupler 500 (e.g., by data acquisition device 200). Flexible coupler 500 may be measured by data acquisition device 200 to acquire the coupler data. The coupler data may include one or more dimensions of flexible coupler 500 as configured. At 908, the coupler data is provided to a controller or another similar device (e.g., controller 300). In one embodiment, the coupler data is transmitted remotely to the controller. At 910, the joint (e.g., joint 108) for connecting the first object and the second object is received. The joint is based on the coupler data. The joint may be received from a user of the controller or from a third party associated with the producer of the joint. In one embodiment, the joint is selected from a parts catalog or database having a plurality of joints. In another embodiment, the joint is produced from a custom joint design based on the coupler data. In one embodiment, the joint is produced by an additive manufacturing process.

Figure 10:
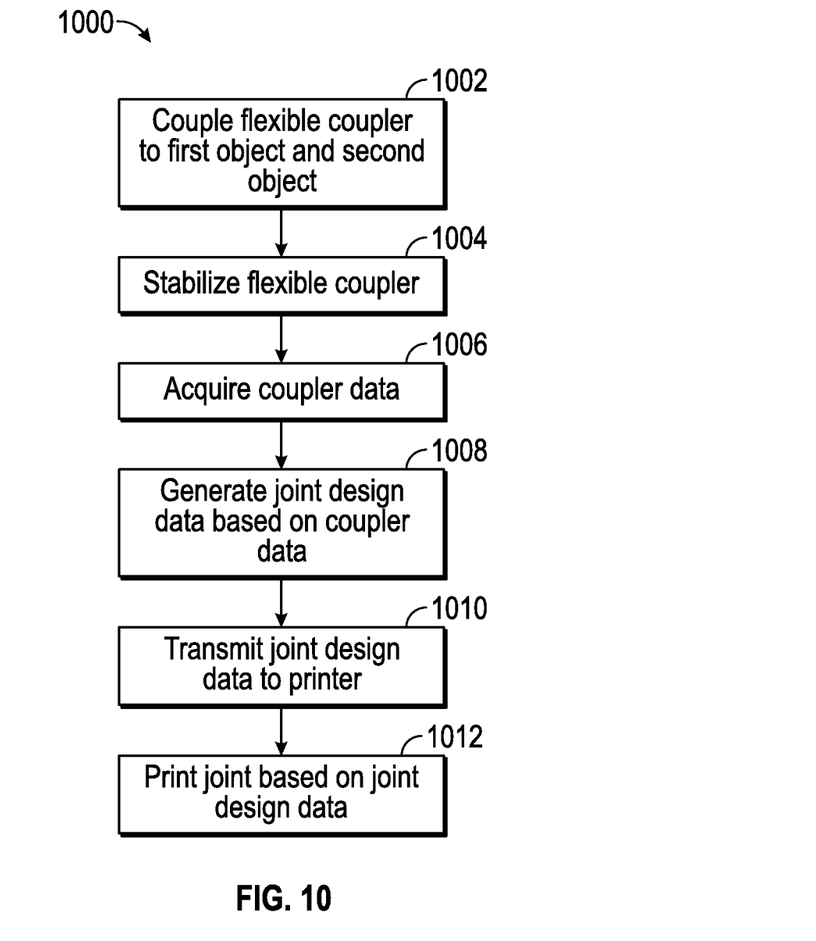
FIG. 10 is flow chart illustration of another process for providing a joint for connecting a first pipe to a second pipe, according to one embodiment.

Referring now to FIG. 10, flow chart 1000 shows another process for providing a joint for connecting a first object and a second object (e.g., pipes 102 and 104), according to one embodiment. At 1002, flexible coupler 500 is coupled to the objects. Ends 502 and 504 may be adjusted to fit the first object and the second object, respectively. At 1004, flexible coupler 500 is stabilized (e.g., hardened or stiffened to maintain a particular shape). At 1006, coupler data is acquired regarding flexible coupler 500 (e.g., by data acquisition device 200). At 1008, joint design data is generated based on the coupler data. The joint design data may be generated by a controller (e.g., controller 300). The joint design data may include a dimension for a suitable joint. The joint design data may be configured to provide a joint for functionally coupling the first object to the second object. At 1010, the joint design data is transmitted to a printer (e.g., printer 400). The joint design data may be sent remotely, such as by a cellular device. At 1012, a joint is generated or printed based on the joint design data. The joint may be printed on-site (e.g., at or near the objects) or the joint may be printed remotely by a third party. The joint design data may also be stored (e.g., by controller 300) and subsequently uploaded to print the joint.

The construction and arrangement of the apparatus, systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the described embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. Such joining may be communicative, rather than physical.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for providing a joint for connecting a first object and a second object, the system comprising:
    a data acquisition device configured to acquire joint parameter data regarding the first object and the second object, wherein the data acquisition device includes a sensor configured to detect relative positions of the first object and the second object and detect a dimension of a portion of at least one of the first object and the second object; and
    a controller coupled to the data acquisition device and configured to identify one or more negative spaces defined by at least the first object, the second object, and at least one reference positioned adjacent to at least one of the first object and the second object and based on the joint parameter data, the controller further configured to provide joint design data regarding a design of the joint based on the joint parameter data and the one or more negative spaces.

2. The system of claim 1, wherein the controller is configured to determine a boundary condition of the joint based on the joint parameter data, and wherein the controller is configured to provide the joint design data based on the boundary condition.

3. The system of claim 1, wherein the controller is configured to determine a custom joint design based on the joint design data.

4. The system of claim 1, wherein the controller is configured to identify an obstruction between the first object and the second object based on the joint parameter data, and wherein the joint design data is based on the obstruction.

5. The system of claim 1, further comprising:
    a database having a plurality of joint designs;
    wherein the controller is configured to select a suitable joint design from the plurality of joint designs based on the joint design data.

6. The system of claim 5, further comprising:
    a printer configured to receive the suitable joint design from the controller and produce the joint based on the suitable joint design.

7. The system of claim 1, wherein the joint is configured to functionally connect the first object to the second object.

8. The system of claim 1, wherein the data acquisition device includes an image sensor for capturing an image, and wherein the image includes at least one of the first object and the second object.

9. The system of claim 8, wherein the data acquisition device is configured to acquire the joint parameter data based on the image.

10. The system of claim 9, further comprising:
a first reference;
wherein the image sensor is configured to capture the first reference within the image; and
wherein the controller is configured to determine the joint design data based on a position of the first reference within the image.

11. The system of claim 10, wherein the controller is configured to determine a position of the first reference relative to at least one of the first object and the second object and determine the joint design data based on the position of the first reference relative to at least one of the first object and the second object.

12. The system of claim 1, wherein the data acquisition device includes an ultrasonic sensor assembly configured to acquire the joint parameter data by sending and receiving ultrasound waves to measure the first object and the second object.

13. The system of claim 12, wherein the ultrasonic sensor assembly is configured to produce an ultrasonic image based on the received ultrasound waves and the joint parameter data includes the ultrasonic image.

14. The system of claim 1, wherein the sensor includes a first metrology sensor configured to determine a dimension of at least one of the first object and the second object.

15. The system of claim 14, wherein the first metrology sensor is configured to determine dimensions of the first object and the second object by contacting the first object and the second object in a designated sequence.

16. The system of claim 14, wherein the first metrology sensor is configured to determine a dimension of a region between the first and second objects by determining a position of the first metrology sensor relative to a reference.

17. The system of claim 16, wherein the reference includes at least one of the first object and the second object.

18. The system of claim 14, wherein the sensor includes a second metrology sensor, wherein the first and second metrology sensors are configured to send signals to each other to determine a relative first metrology sensor position and a relative second metrology sensor position.

19. A method for providing joint design data for a joint configured to couple a first object to a second object, the method comprising:
acquiring joint parameter data regarding the first object and the second object using a data acquisition device, wherein the data acquisition device includes a sensor configured to detect relative positions of the first object and the second object and detect a dimension of a portion of at least one of the first object and the second object;
transmitting the joint parameter data to a controller; and
receiving the joint, wherein the joint is based on joint design data generated by the controller, and wherein the joint design data is based on the joint parameter data and one or more negative spaces defined by at least the first object, the second object, and at least one reference positioned adjacent to at least one of the first object and the second object, the one or more negative spaces identifiable by the controller based on the joint parameter data.

20. The method of claim 19, wherein a joint design for the joint is selected from a database having a plurality of joint designs.

21. The method of claim 19, further comprising:
determining a custom joint design for the joint based on the joint design data using the controller;
wherein the joint is produced based on the custom joint design.

22. The method of claim 19, wherein the joint is received from a third party associated with the controller.

23. A system for providing a joint for coupling a first pipe and a second pipe, the system comprising:
a flexible coupler having a first end and a second end connected by a body, the body being malleable for approximating the joint such that the first end is coupleable to the first pipe and the second end is coupleable to the second pipe;
a data acquisition device configured to acquire coupler data regarding the flexible coupler; and
a controller configured to generate joint design data regarding the joint based on the coupler data and one or more negative spaces defined by at least the first pipe, the second pipe, and at least one reference positioned adjacent to at least one of the first object and the second object, the one or more negative spaces identifiable by the controller.

24. The system of claim 23, further comprising:
a printer configured to print the joint based on the joint design data.

25. The system of claim 23, wherein the data acquisition device includes an image sensor configured to acquire the coupler data by capturing an image of the flexible coupler.

26. The system of claim 25, wherein the coupler data includes the image, and wherein the controller is configured to generate the joint design data based on the image.

27. The system of claim 26, wherein the image sensor is coupled to the controller and configured to acquire the coupler data and transmit the coupler data to the controller.

28. The system of claim 23, wherein the data acquisition device includes a coordinate measuring machine having a probe for measuring a physical characteristic of the flexible coupler, and wherein the coupler data is based on the physical characteristic of the flexible coupler.

29. The system of claim 28, wherein the coordinate measuring machine is configured to measure positions at multiple sites of the flexible coupler and the coupler data is based on the positions.

30. The system of claim 23, wherein the controller includes a memory device configured to store the joint design data.

31. The system of claim 23, wherein the flexible coupler is reusable to separately approximate a plurality of joints.

32. The system of claim 23, wherein the flexible coupler is configured to selectively stabilize to approximate the joint.

33. The system of claim 23, wherein the controller is configured to determine a custom joint design for the joint based on the joint design data.

34. The system of claim 23, further comprising:
a database having a plurality of joint designs;
wherein the controller is configured to select a suitable joint design for the joint from the plurality of joint designs.

35. The system of claim 23, wherein the joint is configured to functionally connect the first pipe to the second pipe.

36. The system of claim 1, wherein the sensor includes a first sensor configured to be coupled to the first object and a second sensor configured to be coupled to the second object.

* * * * *